US009339770B2

(12) United States Patent
Sharma

(10) Patent No.: US 9,339,770 B2
(45) Date of Patent: May 17, 2016

(54) ORGANOSILOXANE FILMS FOR GAS SEPARATIONS

(71) Applicant: Applied Membrane Technology, Inc., Minnetonka, MN (US)

(72) Inventor: Ashok K. Sharma, Hopkins, MN (US)

(73) Assignee: Applied Membrane Technologies, Inc., Minnetonka, MN (US)

( * ) Notice: Subject to any disclaimer, the term of this patent is extended or adjusted under 35 U.S.C. 154(b) by 0 days.

(21) Appl. No.: 14/792,255

(22) Filed: Jul. 6, 2015

(65) Prior Publication Data
US 2015/0306549 A1 Oct. 29, 2015

Related U.S. Application Data

(63) Continuation-in-part of application No. 14/083,843, filed on Nov. 19, 2013, now abandoned.

(51) Int. Cl.
| | |
|---|---|
| *B01D 53/22* | (2006.01) |
| *B01D 69/12* | (2006.01) |
| *B05D 1/00* | (2006.01) |
| *B01D 63/02* | (2006.01) |
| *B01D 67/00* | (2006.01) |
| *B01D 71/70* | (2006.01) |
| *C01B 21/04* | (2006.01) |
| *C01B 13/02* | (2006.01) |
| *B01D 69/02* | (2006.01) |
| *B01D 69/08* | (2006.01) |

(52) U.S. Cl.
CPC ............ *B01D 69/125* (2013.01); *B01D 53/228* (2013.01); *B01D 63/02* (2013.01); *B01D 67/0037* (2013.01); *B01D 67/0072* (2013.01); *B01D 69/02* (2013.01); *B01D 69/08* (2013.01); *B01D 71/70* (2013.01); *B05D 1/62* (2013.01); *C01B 13/0255* (2013.01); *C01B 21/0444* (2013.01); *B01D 2256/10* (2013.01); *B01D 2257/504* (2013.01); *B01D 2325/20* (2013.01)

(58) Field of Classification Search
CPC .... B01D 69/125; B01D 53/228; B01D 63/02; B01D 67/0037; B01D 67/0072; B01D 69/02; B01D 69/08; B01D 71/70; B01D 2256/10; B01D 2257/504; B01D 2325/20; B05D 1/62; C01B 13/0255; C01B 21/0444
See application file for complete search history.

(56) References Cited

U.S. PATENT DOCUMENTS

| | | | |
|---|---|---|---|
| 4,824,444 A | 4/1989 | Nomura | |
| 5,002,652 A | 3/1991 | Nelson et al. | |
| 5,182,317 A * | 1/1993 | Winters | ............. A61L 33/0029 523/112 |
| 5,262,451 A | 11/1993 | Winters et al. | |
| 5,342,693 A | 8/1994 | Winters et al. | |
| 5,354,469 A | 10/1994 | Babcock | |
| 5,439,736 A | 8/1995 | Nomura | |
| 5,463,010 A | 10/1995 | Hu et al. | |
| 5,516,555 A | 5/1996 | Felts | |
| 5,672,422 A * | 9/1997 | Kanda | ..................... B01D 15/08 264/128 |
| 5,763,033 A | 6/1998 | Tropsha et al. | |
| 5,955,588 A | 9/1999 | Tsang et al. | |
| 6,045,877 A * | 4/2000 | Gleason | .................... B05D 1/60 427/255.18 |
| 6,331,248 B1 * | 12/2001 | Taniguchi | .............. B01D 63/02 210/232 |
| 6,383,955 B1 | 5/2002 | Matsuki et al. | |
| 6,613,432 B2 | 9/2003 | Zamora et al. | |
| 6,649,224 B1 | 11/2003 | de Goeje et al. | |
| 6,830,583 B2 | 12/2004 | Shah et al. | |
| 6,887,578 B2 | 5/2005 | Gleason et al. | |
| 7,129,224 B1 | 10/2006 | Byun et al. | |
| 7,192,625 B2 * | 3/2007 | Ohkawa | ..................... C08J 7/06 427/255.29 |
| 7,247,179 B2 * | 7/2007 | Siddiqui | ............. C09K 3/1409 106/11 |
| 7,258,899 B1 | 8/2007 | Sharma et al. | |
| 7,270,849 B2 * | 9/2007 | Hayashi | ................. C08G 77/06 257/E21.262 |
| 7,381,470 B2 | 6/2008 | Suto et al. | |
| 7,500,397 B2 | 3/2009 | Weigel et al. | |
| 7,714,087 B2 | 5/2010 | Imuta et al. | |
| 7,772,350 B2 | 8/2010 | Blanc-Magnard et al. | |
| 7,781,554 B2 | 8/2010 | Lai et al. | |
| 7,807,267 B2 | 10/2010 | Kohmura et al. | |
| 7,901,743 B2 | 3/2011 | Lee et al. | |
| 8,114,465 B2 | 2/2012 | Callahan et al. | |
| 8,128,202 B2 | 3/2012 | Matsuo et al. | |
| 8,158,695 B2 | 4/2012 | Vanderlaan et al. | |
| 8,177,892 B2 * | 5/2012 | Kase | .................. B01D 67/0006 427/508 |
| 8,231,710 B2 * | 7/2012 | Kase | .................... B01D 53/228 427/508 |
| 8,323,753 B2 | 12/2012 | De Vries et al. | |
| 2002/0009604 A1 | 1/2002 | Zamora et al. | |

(Continued)

FOREIGN PATENT DOCUMENTS

| | | |
|---|---|---|
| JP | 10034790 | 2/1998 |
| KR | 20020043702 | 6/2002 |

(Continued)

OTHER PUBLICATIONS

Yu et al., "Plasma Polymerization of Hexamethylcyclotrisiloxane", Chinese Journal of Polymer Science, vol. 7 No. 2 p. 111-118, 1989.

(Continued)

*Primary Examiner* — Jason M Greene
*Assistant Examiner* — Anthony Shumate
(74) *Attorney, Agent, or Firm* — Haugen Law Firm PLLP

(57) ABSTRACT

A semipermeable gas separation membrane is plasma deposited from liquid organosiloxane monomer having at least three silicon atoms and an alpha hydrogen atom. The semipermeable membrane may be employed as a gas-selective membrane in combination with a porous substrate.

13 Claims, No Drawings

(56) References Cited

U.S. PATENT DOCUMENTS

| | | |
|---|---|---|
| 2003/0138645 A1 | 7/2003 | Gleason et al. |
| 2004/0126596 A1 | 7/2004 | Zamora et al. |
| 2005/0227091 A1 | 10/2005 | Suto et al. |
| 2006/0183055 A1* | 8/2006 | O'Neill ............ H01L 21/02126 430/316 |
| 2007/0157884 A1* | 7/2007 | Hayashi ................ C08G 77/06 118/715 |
| 2007/0202612 A1 | 8/2007 | Winter-Jensen et al. |
| 2008/0171156 A1* | 7/2008 | Olijve ................ B01D 67/0006 428/32.26 |
| 2008/0182914 A1* | 7/2008 | Itami ................ B01D 67/0006 521/50.5 |
| 2008/0197078 A1* | 8/2008 | Benevides ......... G01N 30/6091 210/656 |
| 2009/0148615 A1 | 6/2009 | Vangeneugden et al. |
| 2009/0288708 A1 | 11/2009 | Bijker et al. |
| 2010/0026760 A1 | 2/2010 | Matsuo |
| 2010/0162892 A1* | 7/2010 | Kase ................ B01D 67/0006 96/12 |
| 2010/0323192 A1* | 12/2010 | Matsuo .................. B29C 59/14 428/336 |
| 2011/0311808 A1 | 12/2011 | De Vries et al. |
| 2012/0208952 A1* | 8/2012 | Burger ................ B01D 19/0409 524/588 |
| 2013/0115423 A1* | 5/2013 | Ii .............................. B05D 5/00 428/141 |
| 2014/0144323 A1 | 5/2014 | Chen et al. |
| 2014/0150287 A1* | 6/2014 | Ahn ..................... B01D 53/268 34/474 |
| 2014/0154399 A1* | 6/2014 | Weikart .............. A61M 5/3129 427/2.3 |
| 2014/0322519 A1* | 10/2014 | Ahn ..................... C09D 183/04 428/312.6 |
| 2015/0132504 A1* | 5/2015 | Chen .................. B01D 67/0067 427/569 |
| 2015/0135957 A1* | 5/2015 | Sharma ................ B01D 53/228 96/10 |
| 2015/0376365 A1* | 12/2015 | Halbach ..................... C08J 9/28 521/64 |
| 2016/0001237 A1* | 1/2016 | Halbach ................. B01D 71/80 210/654 |

FOREIGN PATENT DOCUMENTS

| | | |
|---|---|---|
| WO | 2006067317 | 6/2006 |
| WO | 2012138755 | 10/2012 |

OTHER PUBLICATIONS

Yasuda, "Plasma Polymerization and Plasma Treatment," Journal of Applied Polymer Science: Applied Polymer Symposium an Interscience Publication, 236 pages, 1984.

* cited by examiner

ORGANOSILOXANE FILMS FOR GAS SEPARATIONS

CROSS-REFERENCE TO RELATED APPLICATIONS

This application is a continuation-in-part of U.S. patent application Ser. No. 14/083,843, filed on Nov. 19, 2013 and entitled "Organosiloxane Films for Gas Separations", the content of which being incorporated herein in its entirety.

FIELD OF THE INVENTION

The present invention relates to plasma polymerized films generally and more particularly to gas separation membranes employing a plasma polymerized film derived from a liquid organosiloxane monomer.

BACKGROUND OF THE INVENTION

Gas separation membranes employing a thin polymeric film have been extensively studied for a wide array of applications. For many gas separation membranes, a thin film is applied to a flat porous substrate, wherein the film contributes the permselective properties to the combination.

The thin film effectuating the gas separation may also be applied in the form of a coating on a porous substrate, such as microporous hollow fibers, which in a bundle is commonly referred to as a hollow fiber module. The microporous hollow fiber substrate may be organic, inorganic, or organo-metallic.

Various polymers have been used as the thin film for gas separations, though researchers are yet to discover a thin film forming polymer that achieves both good gas selectivity and good permeability in order to meet pressing industrial demands. Moreover, conventional polymers offer limited options in the development of suitable polymer-based gas separation films due to the complexity of synthesis, lack of film formation characteristics, poor solubility or chemical resistance, and cumbersome application techniques.

Among conventional polymers, polyorganosilicones, in general, have been targeted for certain applications due to their biocompatibility, low coefficient of friction, and ease of production. Depositing an ultra-thin film of conventional polyorganosilicones, however, remains a challenge. As a consequence, membranes synthesized from conventional polyorganosilicones exhibit low gas permeability (due to their relatively high thickness), poor gas selectivity, poor mechanical properties and poor adhesion.

Plasma polymerization of organic compounds has been used, as an alternative technique, to obtain thin film coatings that are free from pollutants or unwanted byproducts. Most plasma-derived polymers have good chemical resistance, and exhibit strong adhesion to the underlying substrate. The ability to deposit a film with extremely low thickness using this technique also lends advantages in the construction of gas separation membranes of high gas permeability.

Plasma polymerized polymer coatings therefore overcome some of the drawbacks of conventional coating techniques, as they can be deposited as an ultrathin film and provide good gas permeability but most plasma polymers suffer from a low rate of polymer deposition, insufficient pore coverage and hence inferior gas separation characteristics. Most plasma polymers also suffer from poor shelf life in the form of degraded permeability characteristics as they continue to interact with the atmospheric oxygen. Thus, organosilicone-based coatings of high gas selectivity and high gas flux have remained elusive, and have therefore not been widely used in applications in industry where high flux-selective gas permeation is sought.

Among the organosilicone compounds, plasma polymerized organosiloxanes have received particular attention of plasma researchers due to their structural similarity to conventional silicone rubber. Commercially useful coatings have been prepared from plasma polymerization of tetramethyldisiloxane (TMDSO) and hexamthyldisiloxane (HMDSO) monomers for applications in the biomedical areas, for example, for providing lubricity to the substrate. Both TMDSO and HMDSO are relatively low molecular weight compounds that can be easily volatized in the plasma chamber, which is why they have been widely used for plasma polymerization. These monomers, however, suffer from a low rate of polymer deposition, and thus poor substrate pore coverage, and therefore find limited use in gas separation applications.

The use of high molecular weight Organosiloxanes, with boiling points in excess of 100 degree C., has generally been avoided due to the fear of low vapor pressure and hence even lower rate of polymer deposition. U.S. Pat. No. 5,463,010 to Hu et al. describes using hydrocyclosiloxane monomers such as 1,3,5,7-tetramethylcyclotetrasiloxane (B.P. 134-135° C.) for polymeric coatings to a substrate. While such monomers have increased molecular weight, membranes constructed from such monomers are found to exhibit poor aging characteristics. In some applications, fluorinated organic compounds have been co-polymerized with the organosiloxanes to improve hydrophobicity, abrasion resistance and polymer deposition rate. Such fluorinated copolymers, however, suffer from poor bondability to common substrates and adhesives, particularly in membrane applications. As a result, leakage is a commonly-cited problem in membrane modules fabricated from fluorinated copolymers of low molecular weight organosiloxanes.

SUMMARY OF THE INVENTION

Conventional thought on feed monomers in plasma-induced polymerizations has focused upon gas-phase and volatile monomers of relatively low molecular weight to facilitate rapid volatilization, fragmentation and polymerization in the plasma reaction chamber. Applicant has, however, discovered that, contrary to common thinking, certain higher molecular weight feed monomers, such as higher molecular weight aliphatic non-cyclic organosiloxanes, in spite of their low volatility, may actually exhibit a higher rate of plasma polymerization than the more commonly employed more volatile, lower molecular weight organosiloxanes, such as Hexamthyldisiloxane (HMDSO) and Tetramethyl disiloxane (TMDSO). Organosiloxane monomers with at least three silicon atoms and at least one hydrogen atom bonded directly to a respective silicon atom (hereinafter referred as an alpha-hydrogen) surprisingly polymerized more rapidly, and formed a stronger, more integral film than the lower molecular weight organosiloxane monomers. The polymerization properties of these higher molecular weight aliphatic non-cyclic organosiloxane monomers resulted in films with gas separation characteristics suitable for commercial applications. It was further surprisingly found that the films formed from these relatively higher molecular weight monomers also exhibited an increased gas flux and reduced aging effects in comparison to films formed from commonly used lower molecular weight aliphatic organosiloxane monomers.

Among the relatively higher molecular weight organosiloxane monomers useful in the preparation of gas separation membranes of the present invention, applicant has noted the importance of an alpha-hydrogen atom bonded directly to a respective silicon atom. Because the silicon-hydrogen bond has a lower bond energy (94 Kcal/mole) than the carbon-hydrogen bond (112 Kcal/mole), organosiloxanes containing an alpha-hydrogen polymerize readily through a silicon radical propagation reaction, more than through a methylene radical route. The predominantly silicon radical route of the proposed plasma polymerization results in a less cross-linked and mostly linear polymer structure in comparison to a polymer derived through the methylene radical route. Applicant theorizes that the reduced cross-link density of the polymer structure based upon an alpha-hydrogen containing organosiloxane monomer contributes to the surprisingly high gas permeability exhibited in the present films. The weaker silicon-hydrogen bond may also drive the increased rate of polymerization with respect to organosiloxane monomers without an alpha-hydrogen atom.

In comparison to their cyclic analogues, the aliphatic (linear) non-cyclic organosiloxanes of this invention are likely to produce fewer spins (free radicals) in the resulting polymer thereby making the polymer coatings and membranes more stable and less prone to aging.

It was also found that the oxygen:silicon (O:Si) ratio in the organosiloxane monomer contributed to the reactivity of the monomer in plasma polymerization. The discovered benefit of increased O:Si ratio is surprising in light of the ablative properties of oxygen in plasma-driven reactions. It is theorized that the increased presence of oxygen aids in polymerization of the monomer by providing "Oxy" radicals in the same manner as that provided by the conventional oxygen-enriched peroxide catalysts in the polymerization of conventional monomers.

The semi-permeable membranes for gas separations of this invention thus include a polymer that is plasma deposited from an aliphatic non-cyclic organosiloxane monomer having at least three silicon atoms and an alpha-hydrogen atom bonded directly to a respective silicon atom. The membrane exhibits a carbon dioxide gas flux of at least $0.5*10^{-3}$ cm$^3$/cm$^2$*s*cm (Hg), and typically between $1.0*10^{-3}$ cm$^3$/cm$^2$*s*cm (Hg) and $5.0*10^{-3}$ cm$^3$/cm$^2$*s*cm(Hg), and a carbon dioxide/oxygen ($CO_2/O_2$) selectivity of at least about 1.5 and typically between 2.0 and 5.0. The organosiloxane monomers of the present invention have a ratio of oxygen atoms to silicon atoms of at least 0.66:1, and preferably between 0.66:1 and 1:1, and are vaporizable in a plasma environment at a temperature of less than 180° C., preferably less than 150° C., and more preferably between 25 and 100° C., and a pressure of between 1-400 mtorr, and more preferably between 10-200 mtorr. These monomers are plasma polymerizable at ambient temperature (considered to be 20-30° C.) at a pressure of 1-400 mtorr, and more preferably 10-200 mtorr, by application of plasma energy.

A carrier gas is often included in the polymerization reaction to boost the rate of polymer deposition. The carrier gas may be an inert gas, such as argon, or a reactive gas such as oxygen, nitrogen, ammonia, fluorine, water vapors, and the like.

A gas separation module includes a porous substrate and a coating on the substrate, with the coating being plasma deposited from an aliphatic non-cyclic organosiloxane having at least three silicon atoms and an alpha-hydrogen atom bonded directly to a respective silicon atom. The coating exhibits permeability to a first gas that is greater than its permeability to a second gas.

A method for coating a substrate to form a gas separation module includes vaporizing a feed organosiloxane monomer having at least three silicon atoms and an alpha-hydrogen atom bonded directly to a respective silicon atom. The aliphatic non-cyclic organosiloxane monomer is plasma polymerized for deposition onto the substrate as a coating, such that the coated substrate has a carbon dioxide gas flux of at least $0.5*10^{-3}$ cm$^3$/cm$^2$*sec*cm (Hg), and a carbon dioxide/oxygen ($CO_2/O_2$) selectivity of at least 1.5.

It is to be understood that some aliphatic non-cyclic organosiloxane monomers of the present invention may include a plurality of alpha-hydrogen atoms, wherein more than one silicon atom each has one or more respective hydrogen atoms directly bonded thereto.

DETAILED DESCRIPTION OF THE INVENTION

The present invention is directed to thin films plasma polymerized/deposited from aliphatic non-cyclic organosiloxane monomers, wherein the thin films exhibit gas flux and gas selectivity suitable in gas separation applications. The plasma polymerized films may be deposited on a substrate for use as a gas separation module. The thin film may be applied to a porous substrate as a functional and structural support of the membrane module. The deposited polymeric film may therefore be considered as a gas-permeable surface modifier to the underlying substrate, so as to provide gas selectivity without undue diminishment of gas flux.

An example device to which the present invention is applicable includes a blood oxygenator in which oxygen-rich gas flows through tubular gas permeable membranes. As blood flows around the gas permeable membranes, oxygen passes into the blood, thereby causing blood oxygenation, and carbon dioxide passes from the blood into the tubular membranes. Besides the gas exchange properties, the thin polymer coatings of this invention may also prevent blood from wetting the pores of the micro porous substrate making the membrane device usable over a longer period of time.

For the purposes hereof, the terms "membrane" and "membrane module" refer to a device through which a fluid stream is passed for purposes of filtration, and, in the present invention, one which permits the passage of certain fluids to the exclusion of, or at faster rates than other fluids. The terms "membranes" and "membrane modules" may be used interchangeably herein, and may refer to a self-supporting mono or multi-layer film, or composites of mono or multi-layer films with a substrate. The membranes and membrane modules of the present invention are typically considered gas-permeable and liquid-impermeable, and possess permselective properties i.e. one gas transmits at a higher rate than the other. The gas separation by these semipermeable membranes is thought to occur by a solution diffusion mechanism, where the gases first get dissolved in the membrane surface and subsequently diffuse to the other side due to the concentration gradient. Mathematically the solution diffusion of gases through membrane is expressed by the formula:

$$P = S \times D$$

Where, P is the permeability coefficient, S is the solubility coefficient and D is the diffusion coefficient. Gas with the higher Permeability coefficient transmits at a higher rate through the membrane.

As noted above, substrates useful in the practice of this invention vary widely. In typical embodiments, the substrate is gas permeable, and may be porous (e.g., microporous, ultraporous or nanoporous). The substrates may be in various forms, including films, fibers, webs, powders, and other shaped articles, and may be formed of organic materials, inorganic materials, or a combination of such materials.

Organic substrates include polymeric materials such as thermoset and thermoplastic polymers, such as those described in U.S. Pat. No. 7,258,899, herein incorporated by reference. A particular organic substrate for use in the present invention is microporous polypropylene fibers.

In addition to the organic and inorganic substrates generally described above, microporous, ultraporous, and/or nanoporous glass and ceramics in fiber forms, tubular forms, or as monoliths and the like are also suitable.

The organosiloxane monomers from which the semi permeable film of the present invention is plasma polymerized includes, in each molecule, at least three silicon atoms and at least one alpha-hydrogen atom, with each alpha-hydrogen atom bonded directly to a respective silicon atom. Accordingly, some organosiloxanes of the present invention are in accordance with general Formula I:

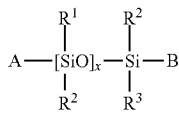

Wherein:
$R^1$, $R^2$, $R^3$ and $R^4$ are each independently selected from group consisting of $C_{1-4}$ alkyl, alkenyl, Hetro functionality or Hydrogen;
A is hydrogen or $C_{1-4}$ alkyl;
B is hydrogen or a $C_{1-4}$ alkyl;
X is an integer $\geq 2$; and
At least one of A and B is hydrogen Example organosiloxanes useful in the invention in accordance with general Formula I include:
1,1,1,5,5,5-Hexamethyltrisiloxane
1,1,1,3,5,5,5-Heptamethyltrisiloxane
Tris(trimethylsiloxy) silane
1,3-Bis(Trimethylsiloxy)1,3-dimethyldisiloxane
Bis(Trimethylsiloxy)ethylsilane
1,1,3,3,5,5,7,7 octamethyltetrasiloxane;
1,1,1,3,3,5,5 heptamethyltrisiloxane;
1,1,3,3,5,5-hexamethyltrisiloxane;
Nonamethyltetrasiloxane; and
Dodecamethylpentasiloxane The above-listed organosiloxanes are not exhaustive as to the organosiloxane monomers contemplated as being useful in the present invention. Thus any aliphatic non-cyclic organosiloxane monomer having at least three silicon atoms in its molecular structure and an alpha-hydrogen atom bonded to a respective silicon atom and which can be plasma polymerized in a vacuum environment at a pressure between 1-400 mtorr, alone or in combination with other organic and organometallic vaporizable compounds including other siloxanes, silanes, cyclic siloxanes, fluorocarbons and reactive gases such as Nitrogen, Oxygen, Ammonia, Water vapors, and sulfur dioxide are considered potential candidates for the formation of gas separation membranes of the present invention.

EXAMPLES

The following general example is provided to present the techniques employed in forming the gas separation films set forth in the specific examples.
1. Substrate Preparation: Porous substrates such as Polypropylene hollow fiber and films do not require any cleaning prior to polymer deposition and were used as received.
2. Preparation of Organosiloxane Monomer: Organosiloxanes used in this study were employed in a form as received, without blending with any solvent.
3. Volatilization of Organosiloxane: Many Organosiloxane have adequate vapor pressure at room temperature. Some may require heating in order to generate the monomer feed rate required for the study. Heating is generally performed under vacuum so that the monomer does not oxidatively disintegrate. Inert gas can be used as carrier to facilitate volatilization or to assist in plasma polymerization.
4. Plasma Reactor: A tubular plasma reactor, employing capacitively coupled external electrodes, powered by a RF power generator at 13.56 MHz through a matching network of conductors and capacitors was used for this study. The porous substrate (hollow fiber membrane or flat film) was passed through the plasma zone, reel to reel, using a network of motors, pulleys and mechanical couplings. The pressure in the plasma chamber was set by controlling monomer feed rate, reactor dimensions, and outlet pressure, and was monitored by a Baratron gauge. The monomer flow rate was controlled by MKS/Unit Mass flow controllers operating in different ranges, varying from 0-20 to 0-500 SCCM of Nitrogen.
5. Plasma treatment and conversion: Hollow fiber substrates are plasma polymer coated in a semi-continuous manner wherein the uncoated substrate is moved from reel to reel through the plasma zone. Once the substrate is loaded, the system is evacuated and the requisite amount of monomer/s vapors are allowed to enter the plasma chamber through one of the monomer mass flow controllers. An Inert gas such as Argon or Helium or a reactive gas such as Oxygen is often incorporated in the feed mixture to boost the polymerization efficiency. Other reactive gases, such as Nitrogen, Fluorine or fluorine containing compounds, Sulfur dioxide, Freon, Ammonia, and the like can also be incorporated to improve deposition efficiency and/or nitrogen/oxygen/fluorine content of the polymer or to add new functionality, or to fine tailor other properties of the deposited film. Hydrocarbon monomers, silanes, siloxanes, and Nitrogen containing compounds can be copolymerized in different proportion with the monomers of this invention to provide polymers with various new properties. System pressure in each case is adjusted to the desired level by throttling the vacuum pump valve or by changing monomer feed rate. Once the pressure is stabilized the glow is turned on and at the same time the hollow fiber substrate is allowed to pass through the plasma zone where it becomes coated by the plasma polymer before it rewinds on the take up spools in the product zone. The thickness of the coating is controlled by adjusting the speed of the substrate fiber movement through plasma zone and/or by varying the discharge power, and/or the monomer feed rate, and/or system pressure. Blends of two or more similar or widely different monomers may be used to produce copolymers which may have distinctly different properties and applications than the homopolymer produced from a single monomer. Both pulsed and continuous plasmas may be used.
 Flat Microporous substrates may be coated in the same manner using a batch or semi-continuous reactor. Rigid substrates may be coated in a batch process.
6. Optional processing steps include re-coating the partially coated fiber with another polymer or treating the partially coated fiber with reactive plasma using the same or different process to improve its performance or to provide additional functionalities. In certain cases, the coated fiber is further treated with a functionalizing material such as ammonia or an organic amine plasma to provide specific functionality to the substrate surface which can form covalent bonds with a bio-molecule, such as heparin to impart hemo-compatible properties to the membrane. In yet another case, the coated fiber may be further modified using conventional chemistry in order to impart specific fluid separation characteristics.

7. Testing Gas permeability of the coated Fiber. The membranes prepared by the general method described above are often tested for their gas separation properties. A known length of fiber membrane is wrapped around a plastic shepherd hook and potted at one end with epoxy resin in such a way that the lumen of the hollow fiber membrane is separated from the outer surfaces of the fibers in the bundle. $CO_2$, $O_2$ and $N_2$ gases are generally used for the permeability measurement. Other gases can be employed depending on the end application of the membrane. In each case the amount of gas flow rate through the lumens of the fiber membrane at a specific gas pressure and for a specific surface area of the membrane is measured using an array of mass flow meters. An average of minimum three membrane samples is reported. Gas selectivity is calculated from the specific gas flux measured through the membrane for different gases.

SPECIFIC EXAMPLES

The following specific examples are provided to demonstrate the principles of the present invention, and follow the procedure set forth in the above general example.

Example 1

For comparison purposes microporous Polypropylene Hollow Fiber membrane, trade name Celgard X30/240, was coated with a thin coating of plasma polymer formed from 1,1,3,3-Tetramethyldisiloxane (TMDSO) monomer vapors in a plasma environment at 70 watts RF power, 60 mtorr pressure, 110 SCCM monomer flow rate (measured on MKS mass flow controller calibrated for Nitrogen). The exposure time was 12.5 seconds.

Example 2

For comparison purposes microporous Polypropylene Hollow Fiber membrane, trade name Celgard X30/240, was coated with a thin coating of plasma polymer formed from a 1,1,3,3-Tetramethyldisiloxane (TMDSO) monomer vapors in a plasma environment at 70 watts RF power, 40 mtorr pressure, 110 SCCM monomer flow rate (measured on MKS mass flow controller calibrated for Nitrogen). The exposure time was 12.5 seconds.

Example 3

For comparison purposes microporous Polypropylene Hollow Fiber membrane, trade name Celgard X30/240, was coated with a thin coating of plasma polymer formed from 1,1,3,3-Tetramethyldisiloxane (TMDSO) monomer vapors in a plasma environment at 60 watts RF power, 30 mtorr pressure, 55 SCCM monomer flow rate (measured on MKS mass flow controller calibrated for Nitrogen). The exposure time was 12.5 seconds.

Example 4

For comparison purposes microporous Polypropylene Hollow Fiber membrane, trade name Celgard X30/240, was coated with a thin coating of plasma polymer formed from a 1,1,1,3,3,3-Hexamethyldisiloxane (HMDSO) monomer vapors in a plasma environment 70 watts RF power, 40 mtorr pressure, 110 SCCM monomer flow rate (measured on MKS mass flow controller calibrated for Nitrogen). The exposure time was 12.5 seconds Example 5

For comparison purposes microporous Polypropylene Hollow Fiber membrane, trade name Celgard X30/240, was coated with a thin coating of plasma polymer formed from 1,1,1,3,3-Pentamethyldisiloxane (PMDSO) monomer vapors in a plasma environment at 70 watts RF power, 40 mtorr pressure, 110 SCCM monomer flow rate (measured on MKS mass flow controller calibrated for Nitrogen). The exposure time was 12.5 seconds.

Example 6

For comparison purposes microporous Polypropylene Hollow Fiber membrane, trade name Celgard X30/240, was coated with a thin coating of plasma polymer formed from 1,1,3,3,5,5,7,7-Octamethylcyclotetrasiloxane (OMCTS) monomer vapors in a plasma environment at 15 watts RF power, 14 mtorr pressure, 30 SCCM monomer flow rate (measured on MKS mass flow controller calibrated for Nitrogen). The exposure time was 34 seconds.

Example 7

Microporous Polypropylene Hollow Fiber membrane, trade name Celgard X30/240, was coated with a thin coating of plasma polymer formed from 1,1,3,3,5,5-Hexamethyltrisiloxane (HMTrSO) monomer vapors in a plasma environment at 70 watts RF power, 60 mtorr pressure, 110 SCCM monomer flow rate (measured on MKS mass flow controller calibrated for Nitrogen). The exposure time was 12.5 seconds.

Example 8

Microporous Polypropylene Hollow Fiber membrane, trade name Celgard X30/240, was coated with a thin coating of plasma polymer formed from 1,1,3,3,5,5-Hexamethyltrisiloxane (HMTrSO) monomer vapors in a plasma environment at 70 watts RF power, 40 mtorr pressure, 110 SCCM monomer flow rate (measured on MKS mass flow controller calibrated for Nitrogen). The exposure time was 12.5 seconds.

Example 9

Microporous Polypropylene Hollow Fiber membrane, trade name Celgard X30/240, was coated with a thin coating of plasma polymer formed from 1,1,3,3,5,5-Hexamethyltrisiloxane (HMTrSO) monomer vapors in a plasma environment at 70 watts RF power, 30 mtorr pressure, 110 SCCM monomer flow rate (measured on MKS mass flow controller calibrated for Nitrogen). The exposure time was 12.5 seconds.

Example 10

Microporous Polypropylene Hollow Fiber membrane, trade name Celgard X30/240, was coated with a thin coating of plasma polymer formed from 1,1,3,3,5,5-Hexamethyltrisiloxane (HMTrSO) monomer vapors in a plasma environment at 60 watts RF power, 30 mtorr pressure, 55 SCCM monomer flow rate (measured on MKS mass flow controller calibrated for Nitrogen). The exposure time was 12.5 seconds.

Example 11

Microporous Polypropylene Hollow Fiber membrane, trade name Celgard X30/240, was coated with a thin coating of plasma polymer formed from 1,1,3,3,5,5,7,7-Octamethyltetrasiloxane (OMTtSO) monomer vapors in a plasma environment at 60 watts RF power, 30 mtorr pressure, 55 SCCM monomer flow rate (measured on MKS mass flow controller calibrated for Nitrogen). The exposure time was 12.5 seconds.

Example 12

For comparison purposes, Microporous Polypropylene Hollow Fiber membrane, trade name Celgard X30/240, was coated with a thin coating of plasma polymer formed from 1,3,5,7-Tetramethylcyclotetrasiloxane (TMCTS) monomer vapors in a plasma environment at 15 watts RF power, 14 mtorr pressure, 30 SCCM monomer flow rate (measured on MKS mass flow controller calibrated for Nitrogen). The exposure time was 34 seconds Example 13

For comparison purposes, microporous Polypropylene Hollow Fiber membrane, trade name Celgard X30/240, was coated with a thin coating of plasma polymer formed from 1,1,3,3-Tetramethyldisiloxane (TMDSO) monomer vapors in a plasma environment at 60 watts RF power, 60 mtorr pressure, 110 SCCM monomer flow rate (measured on MKS mass flow controller calibrated for Nitrogen). The exposure time was 12.5 seconds.

Example 14

Microporous Polypropylene Hollow Fiber membrane, trade name Celgard X30/240, was coated with a thin coating of plasma co-polymer formed by copolymerizing 1,1,3,3-Tetramethyldisiloxane (TMDSO) monomer with 1,1,3,3,5,5-Hexamethyltrisiloxane (HMTrSO) monomer (100:10 molar ratio) in a plasma environment at 60 watts RF power, 30 mtorr pressure, 110 SCCM total monomer flow rate (measured on MKS mass flow controller calibrated for Nitrogen). The exposure time was 12.5 seconds Example 15

Microporous Polypropylene Hollow Fiber membrane, trade name Celgard X30/240, was coated with a thin coating of plasma co-polymer formed by copolymerizing 1,1,3,3-Tetramethyldisiloxane (TMDSO) monomer with 1,1,3,3,5,5-Hexamethyltrisiloxane (HMTrSO) monomer (85:25 molar ratio) in a plasma environment at 60 watts RF power, 30 mtorr pressure, 110 SCCM total monomer flow rate (measured on MKS mass flow controller calibrated for Nitrogen). The exposure time was 12.5 seconds Example 16

Microporous Polypropylene Hollow Fiber membrane, trade name Celgard X30/240, was coated with a thin coating of plasma co-polymer formed by copolymerizing 1,3,5,7-Tetramethylcyclotetrasiloxane (TMCTS) monomer with 1,1,3,3,5,5-Hexamethyltrisiloxane (HMTrSO) monomer (65:25 molar ratio) in a plasma environment at 40 watts RF power, 25 mtorr pressure, 90 SCCM total monomer flow rate (measured on MKS mass flow controller calibrated for Nitrogen). The exposure time was 12.5 seconds Example 17

For comparison purposes, Microporous Polypropylene Hollow Fiber membrane, trade name Celgard X30/240, was coated with a thin coating of plasma polymer formed from 1,3,5,7-Tetramethylcyclotetrasiloxane (TMCTS) monomer vapors in a plasma environment at 40 watts RF power, 25 mtorr pressure, 90 SCCM monomer flow rate (measured on MKS mass flow controller calibrated for Nitrogen). The exposure time was 12.5 seconds Example 18

Microporous Polypropylene Hollow Fiber membrane, trade name Celgard X30/240, was coated with a thin coating of plasma polymer formed from 1,1,3,3,5,5-Hexamethyltrisiloxane (HMTrSO) monomer vapors in a plasma environment at 60 watts RF power, 30 mtorr pressure, 82.5 SCCM monomer flow rate (measured on MKS mass flow controller calibrated for Nitrogen). The exposure time was 12.5 seconds.

Example 19

For Comparison purposes, Microporous Polypropylene Hollow Fiber membrane, trade name Celgard X30/240, was coated with a thin coating of plasma polymer formed from 1,1,1,3,3,5,5,5-Octamethyltrisiloxane (OMTrSO) monomer vapors in a plasma environment at 60 watts RF power, 30 mtorr pressure, 82.5 SCCM monomer flow rate (measured on MKS mass flow controller calibrated for Nitrogen). The exposure time was 12.5 seconds.

Example 20

Microporous Polypropylene Hollow Fiber membrane, trade name Celgard X30/240, was coated with a thin coating of plasma polymer formed from 1,1,3,3,5,5-Hexamethyltrisiloxane (HMTrSO) monomer vapors and Hexafluoroethane gas in a plasma environment at 60 watts RF power, 30 mtorr pressure, 82.5 SCCM and 5.5 SCCM monomer flow rate respectively (measured on MKS mass flow controller calibrated for Nitrogen). The exposure time was 12.5 seconds.

Example 21

For comparison purposes, Microporous Polypropylene Hollow Fiber membranes, trade name Celgard X30/240, coated with thin coatings of plasma polymers in examples 9, 13 and 17 were further treated with the plasma of functionalizing monomer N-(trimethylsilyl)allylamine (TMSAA) at a monomer flow rate of 100 SCCM (measured on MKS mass flow controller calibrated for Nitrogen), pressure 40 mtorr and RF power of 5 Watt. The exposure time was 9 sec.

Examples 7-11, 14-16, and 20 represent data of the films of the present invention. Others are for comparison purposes.

Results

Gas permeability (specific Flux of $N_2$, $O_2$, $CO_2$,), gas selectivity ($\alpha CO_2/O_2$ and $\alpha O_2/N_2$) and Membrane Utilization Factor (MUF) for $CO_2$ were tested on the example films. The MUF ($CO_2$) is an empirical parameter derived by multiplying the square of the selectivity of the membrane for carbon dioxide to oxygen ($\alpha CO_2/O_2$), and the gas permeability of the membrane to $CO_2$, ($CO_2$ Flux) multiplied by 1,000. Values for the MUF greater than unity are desired for gas separation applications. Membranes that have $\alpha CO_2/O_2$ of ≤1 were given an MUF value of zero. The gas flux and selectivity data were obtained by measuring the permeability of the membrane to $CO_2$, $N_2$ and $O_2$ gases as described herein.

The following Table 1 demonstrates the surprisingly enhanced gas flux, selectivity, and MUF of the membranes prepared by plasma polymerization of relatively higher molecular weight organosiloxane monomers (HMTrSO and OMTtSO vs. TMDSO) under identical polymerization conditions. The $CO_2$ flux is presented in the unit of $10^{-3}$ cm$^3$/cm$^2$*sec*cm (Hg) in all of the tables.

TABLE 1

| Example | Monomer | $CO_2$ Flux | $CO_2/O_2$ | $O_2/N_2$ | MUF ($CO_2$) |
| --- | --- | --- | --- | --- | --- |
| Example 1 | TMDSO | 1.17 | 3.86 | 1.96 | 17.43 |
| Example 7 | HMTrSO | 1.74 | 4.06 | 1.90 | 28.68 |
| Example 2 | TMDSO | 1.78 | 3.11 | 1.45 | 17.21 |
| Example 8 | HMTrSO | 2.50 | 3.60 | 1.63 | 32.40 |
| Example 9 | HMTrSO | 2.62 | 3.81 | 1.75 | 38.03 |
| Example 3 | TMDSO | NO SEPN | n/a | n/a | 0.00 |
| Example 10 | HMTrSO | 0.69 | 1.55 | 1.09 | 1.66 |
| Example 11 | OMTtSO | 0.68 | 2.12 | 1.24 | 3.06 |

The gas flux, selectivity, and MUF data in the following Table 2 demonstrates the discovered benefit of using monomers with one or more alpha-hydrogen atoms per monomer molecule. In each category, monomers with one or more alpha ($\alpha$)-hydrogen atoms exhibited higher MUF values and/or superior film-forming characteristics. The discovered benefit of higher molecular weight monomers (3-Si organosiloxane v. 2-Si organosiloxane) is also demonstrated in comparing Example 19 with Example 4 (both with no $\alpha$-hydrogen atoms), and in comparing Example 2 with Example 18 (both with two $\alpha$-hydrogen atoms):

TABLE 2

| Example | Monomer | $\alpha$-Hydrogen Atoms | $CO_2$ Flux | $CO_2/O_2$ | $O_2/N_2$ | MUF ($CO_2$) |
| --- | --- | --- | --- | --- | --- | --- |
| Example 2 | TMDSO | 2 | 1.78 | 3.11 | 1.45 | 17.21 |
| Example 5 | PMDSO | 1 | 5.97 | NO SEPN | n/a | 0.00 |
| Example 4 | HMDSO | 0 | 14.00 | NO SEPN | n/a | 0.00 |
| Example 18 | HMTrSO | 2 | 1.67 | 4.21 | 2.11 | 29.6 |
| Example 19 | OMTrSO | 0 | 6.28 | 1.24 | 1.01 | 9.6 |
| Example 12 | TMCTS | 4 | 1.02 | 4.53 | 2.00 | 20.96 |
| Example 6 | OMCTS | 0 | 2.62 | 1.96 | 1.14 | 10.96 |

The gas flux, selectivity, and MUF data in the following Table 3 demonstrates the discovered benefit of copolymers made by using the aliphatic non-cyclic siloxane monomers of this invention. In each case, the MUF ($CO_2$) increased with the presence of the copolymerizing material HMTrSO of this invention. Incorporation of hexafluoroethane with HMTrSO, as in Example 20, provided a similar benefit as in the incorporation of reactive gases such as oxygen, and also lead to a higher rate of deposition. The hexafluoroethane monomer not only provides atomic fluorine in the plasma to act as a catalyst, but also functionalizes the resulting polymer with a fluorine moiety. HFE alone is not capable of forming a membrane film.

TABLE 3

| Example | Monomers | $CO_2$ Flux | $CO_2/O_2$ | $O_2/N_2$ | MUF ($CO_2$) |
| --- | --- | --- | --- | --- | --- |
| Example 13 | TMDSO | 2.17 | 2.55 | 1.31 | 14.1 |
| Example 14 | TMDSO + HMTrSO | 2.07 | 3.11 | 1.50 | 20.0 |
| Example 15 | TMDSO + HMTrSO | 2.03 | 3.33 | 1.59 | 22.5 |
| Example 17 | TMCTS | 0.68 | 4.64 | 2.26 | 14.7 |
| Example 16 | TMCTS + HMTrSO | 0.91 | 4.33 | 2.24 | 17.1 |
| Example 20 | HFE + HMTrSO | 2.32 | 2.59 | 1.30 | 15.6 |

The results demonstrate the importance of an alpha-hydrogen atom bonded to a respective silicon atom in the plasma polymerization of the organosiloxanes. The membrane in Example 5 was deposited from HMDSO, a monomer with molecular weight intermediate between that of TMDSO and HMTrSO, under identical conditions as those employed in polymerizing from TMDSO and HMTrSO, but was found to have a very low polymerization rate, and nearly no film forming tendency as depicted by high carbon dioxide flux and very low to no gas selectivity. A low rate of polymerization was also noted in Example 19, since the monomer OMTrSO also lacks an alpha-hydrogen atom. Applicant theorizes that such lack of good film forming tendency demonstrated by a relatively lower rate of polymerization may be due to the lack of alpha-hydrogen atoms in the HMDSO and OMTrSO monomers. The Membrane Utilization Factor (MUF) for the membrane in Example 5 was 0, as contrasted from an MUF of 17.21 for the Example 2 preparation. A similar trend was observed in Examples 18 and 19, wherein the MUF value for the membrane prepared in Example 18 was 29.6, in contrast to the MUF value of only 9.6 for the membrane prepared in Example 19.

The cyclic organosiloxane monomers in Examples 6 and 12 were found to follow the same trend. Here again, the Example 12 preparation using the TMCTS monomer, that has alpha-hydrogen atoms, exhibited much higher MUF than the Example 6 preparation formed from OMCTS monomer, which has no alpha-hydrogen atoms in spite of the higher molecular weight of the OMCTS monomer.

Perhaps the most surprising aspect of the present invention is the slow aging tendency of the membranes prepared from relatively higher molecular weight aliphatic, non-cyclic organosiloxane monomers with alpha hydrogen(s) when exposed to air. It is well known that plasma polymers continue to crosslink and react with atmospheric gases (oxygen, water vapors, etc.) until full saturation. This ongoing oxidation results in the reduction of gas flux and selectivity performance of the membrane. It was surprisingly discovered that, under identical storage conditions, membranes deposited from plasma polymerization of relatively higher molecular weight HMTrSO monomer of this invention exhibited not only less reduction in carbon dioxide flux at 28 and 60 days, but also showed an increase in carbon dioxide/nitrogen selectivity compared to the membranes prepared from TMDSO or TMCTS monomers. The difference in aging behavior continued through 900 days, thereby further exhibiting the benefits of the membranes of the present invention. The following table demonstrates results taken from membranes prepared from TMDSO, TMCTS and HMTrSO monomers of Examples 9, 13, and 17 under identical storage conditions:

TABLE 4

| Monomer | Aging Period | Change In $CO_2$ Flux | Change In $CO_2/O_2$ Selectivity |
|---|---|---|---|
| TMCTS | 28 Days | −16.0% | −3.3% |
| TMDSO | 28 Days | −15.2% | −3.4% |
| HMTSO | 28 Days | −9.80% | +1.7% |
| TMCTS | 60 Days | −18.8% | −4.0% |
| TMDSO | 60 Days | −18.5% | −5.0% |
| HMTrSO | 60 Days | −12.9% | +1.5% |
| TMCTS | 120 Days | −24.35 | −6.4% |
| TMDSO | 120 Days | −22.7% | −2.3% |
| HMTrSO | 120 Days | −14.3% | +2.1% |
| TMCTS | 900 Days | −44.8% | −13.3% |
| TMDSO | 900 Days | −35.3% | −10.9% |
| HMTrSO | 900 Days | −24.9% | +3.1% |

A further advantage of the membranes of the present invention may be exhibited after functionalization of the resultant plasma polymers. Table 5 below sets forth the changes in flux ($CO_2$) and selectivity of TMDSO, TMCTS, and HMTrSO membranes after each was aminated by further treatment with N-(trimethylsilyl) allylamine (TMSAA) plasma, as described in Example 21. Aminated membranes prepared from HMTrSO, an aliphatic non-cyclic organosiloxane monomer of this invention exhibited the lowest reduction in flux and selectivity over time, as compared to other monomers, including cyclic organosiloxane monomers of the prior art. The anti-aging properties of the present membranes are particularly useful for a variety of industrial applications that require extended life spans.

TABLE 5

| Treatment | Aging Period | Change In $CO_2$ Flux | Change In $CO_2/O_2$ Selectivity |
|---|---|---|---|
| TMCTS + TMSAA | 60 Days | −18.2% | −3.7% |
| TMDSO + TMSAA | 60 Days | −10.0% | −2.1% |
| HMTrSO + TMSAA | 60 Days | −6.1% | +1.0% |
| TMCTS + TMSAA | 364 Days | −32.8% | −17.8% |
| TMDSO + TMSAA | 364 Days | −18.4% | −12.1% |
| HMTrSO + TMSAA | 364 Days | −13.2% | −4.4% |
| TMCTS + TMSAA | 750 Days | −48.1% | −21.4% |
| TMDSO + TMSAA | 750 Days | −21.6% | −20.2% |
| HMTrSO + TMSAA | 750 Days | −16.7% | −5.7% |

What is claimed is:

1. A semi permeable membrane for gas separations, said membrane comprising a polymer that is plasma polymerized from an aliphatic non-cyclic organosiloxane monomer having at least three silicon atoms and at least one alpha hydrogen atom bonded directly to a respective silicon atom, said membrane having a carbon dioxide gas flux of at least $0.5*10^{-3}$ $cm^3/cm^2*sec*cm(Hg)$, and a carbon dioxide/oxygen selectivity of at least 1.5.

2. A semi permeable membrane as in claim 1 wherein said organosiloxane monomer has a ratio of oxygen atoms to silicon atoms of at least 0.66:1.

3. A semi permeable membrane as in claim 1 wherein said aliphatic non-cyclic organosiloxane monomer is vaporizable in a vacuum environment and produce a pressure between 1-400 mtorr, and plasma polymerizable at an ambient temperature at a pressure of 1-400 mtorr.

4. A semi permeable membrane as in claim 1 wherein said aliphatic non-cyclic monomer is selected from the group consisting of 1,1,3,3,5,5-Hexamethyltrisiloxane, 1,1,3,3,5,5,7,7 octamethyltetrasiloxane; 1,1,1,3,3,5,5 Heptamethyltrisiloxane, 1,1,1,5,5,5-Hexamethyltrisiloxane, and 1,1,1,3,5,5,5-Heptamethyltrisiloxane.

5. A semi permeable membrane as in claim 1, wherein said polymer is plasma polymerized from said aliphatic non-cyclic organosiloxane monomer having at least two alpha hydrogen atoms, each alpha hydrogen atom being bonded to a respective distinct silicon atom.

6. A semipermeable membrane as in claim 1, wherein said polymer is plasma copolymerized from said aliphatic non-cyclic organosiloxane monomer and another siloxane monomer.

7. A semipermeable membrane of claim 1, produced by plasma copolymerizing said aliphatic non-cyclic organosiloxane monomer with a reactive gas selected from the group consisting of nitrogen, oxygen, air, ammonia, water vapor, sulphur dioxide, carbon dioxide, and combinations thereof.

8. A gas separation module, comprising:
   a porous substrate; and
   a coating on said substrate, said coating being plasma deposited from an aliphatic non-cyclic organosiloxane having at least three silicon atoms and a hydrogen atom bonded directly to a respective silicon atom, said coating having a permeability to a first gas that is greater than its permeability to a second gas.

9. A gas separation module as in claim 8 wherein said substrate is a hollow fiber.

10. A gas separation module as in claim 8 wherein said organosiloxane has a ratio of oxygen atoms to silicon atoms of at least 0.66:1.

11. A gas separation module as in claim 8 wherein the first gas is carbon dioxide and the second gas is oxygen.

12. A method for coating a substrate to form a gas separation module, said method comprising:
   vaporizing a feed aliphatic non-cyclic organosiloxane monomer having at least three silicon atoms and at least two alpha-hydrogen atoms bonded to respective silicon atoms; and
   plasma polymerizing said aliphatic non-cyclic organosiloxane monomer for deposition onto the substrate as a coating, such that the coated substrate has a carbon dioxide gas flux of at least $0.5*10^{-3}$ $cm^3/cm^2*sec*cm$ (Hg), and a carbon dioxide/oxygen selectivity of at least 1.5.

13. A method as in claim 12, including warming said feed aliphatic non-cyclic organosiloxane monomer in a liquid bath to an extent sufficient to vaporize said feed aliphatic non-cyclic organosiloxane monomer in a plasma polymerization reaction chamber at a pressure of between 1-400 mtorr.

* * * * *